(12) United States Patent
Slattery et al.

(10) Patent No.: US 8,601,850 B2
(45) Date of Patent: Dec. 10, 2013

(54) INCREMENTAL FORGING

(71) Applicants: Kevin T. Slattery, Saint Charles, MO (US); James B. Castle, Saint Charles, MO (US); Christopher S. Huskamp, St. Louis, MO (US)

(72) Inventors: Kevin T. Slattery, Saint Charles, MO (US); James B. Castle, Saint Charles, MO (US); Christopher S. Huskamp, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/626,408

(22) Filed: Sep. 25, 2012

(65) Prior Publication Data
US 2013/0019649 A1    Jan. 24, 2013

Related U.S. Application Data

(63) Continuation of application No. 12/541,071, filed on Aug. 13, 2009, now Pat. No. 8,302,450.

(51) Int. Cl.
*B21D 22/00* (2006.01)
*B21D 37/02* (2006.01)

(52) U.S. Cl.
USPC .................................. 72/357; 72/413; 72/473

(58) Field of Classification Search
USPC ................ 72/256, 357, 413, 473, 478, 481.1; 264/313
See application file for complete search history.

(56) References Cited

U.S. PATENT DOCUMENTS

| | | | |
|---|---|---|---|
| 6,044,685 A | 4/2000 | Delgado et al. |
| 6,134,783 A | 10/2000 | Bargman et al. |
| 7,083,076 B2 | 8/2006 | Slattery |
| 7,128,948 B2 | 10/2006 | Slattery |
| 7,156,276 B2 | 1/2007 | Slattery |
| 7,225,967 B2 | 6/2007 | Slattery |
| 7,347,351 B2 | 3/2008 | Slattery |
| 7,353,978 B2 | 4/2008 | Slattery et al. |
| 7,381,446 B2 | 6/2008 | Slattery |
| 7,398,911 B2 | 7/2008 | Slattery et al. |
| 7,431,194 B2 | 10/2008 | Slattery |
| 7,509,725 B2 | 3/2009 | Huskamp et al. |
| 7,515,986 B2 | 4/2009 | Huskamp |
| 2003/0168494 A1 | 9/2003 | Halley et al. |
| 2004/0004108 A1 | 1/2004 | Halley et al. |
| 2004/0094604 A1 | 5/2004 | Halley et al. |

(Continued)

FOREIGN PATENT DOCUMENTS

| | | |
|---|---|---|
| JP | 2007152412 | 6/2007 |
| WO | 2011019447 | 2/2011 |

OTHER PUBLICATIONS

The United States Patent and Trademark Office, Non-Final Office Action, issued for U.S. Appl. No. 12/541,071, mailed on Dec. 21, 2011, 8 pages.

(Continued)

*Primary Examiner* — Teresa M Ekiert
(74) *Attorney, Agent, or Firm* — Hanley, Flight & Zimmerman, LLC

(57) ABSTRACT

Any of various features of a workpiece are forged by a common set of tools. The feature is incrementally forged as the tool set is moved to successive forging locations on the surface of the workpiece. One of the tools is used to plasticize and extrude a portion of the workpiece while one or more of the other tools are used to form dams that contain and shape the extruded portions.

13 Claims, 9 Drawing Sheets

(56) References Cited

U.S. PATENT DOCUMENTS

| | | |
|---|---|---|
| 2004/0112941 A1 | 6/2004 | Slattery |
| 2005/0084701 A1 | 4/2005 | Slattery |
| 2005/0127139 A1 | 6/2005 | Slattery et al. |
| 2005/0127140 A1 | 6/2005 | Slattery |
| 2006/0016854 A1 | 1/2006 | Slattery |
| 2006/0037992 A1 | 2/2006 | Slattery |
| 2006/0059848 A1 | 3/2006 | MacDonald-Schmidt et al. |
| 2006/0060635 A1 | 3/2006 | Slattery et al. |
| 2006/0236544 A1 | 10/2006 | Huskamp et al. |
| 2007/0014983 A1 | 1/2007 | Slattery |
| 2007/0050979 A1 | 3/2007 | Huskamp et al. |
| 2007/0075121 A1 | 4/2007 | Slattery |
| 2007/0186507 A1 | 8/2007 | Slattery |
| 2008/0262659 A1 | 10/2008 | Huskamp |
| 2008/0276566 A1 | 11/2008 | Slattery et al. |
| 2008/0277451 A1 | 11/2008 | Slattery et al. |
| 2009/0032677 A1* | 2/2009 | Hijlkema .................... 264/241 |
| 2009/0173132 A1* | 7/2009 | Mathai et al. .................. 72/356 |

OTHER PUBLICATIONS

The United States Patent and Trademark Office, Notice of Allowance, issued for U.S. Appl. No. 12/541,071, mailed on Jun. 20, 2012, 7 pages.

\* cited by examiner

INCREMENTAL FORGING

RELATED APPLICATION

This application is a continuation of U.S. application Ser. No. 12/541,071, filed Aug. 13, 2009, now U.S. Pat. No. 8,302, 450, which is hereby incorporated herein by reference in its entirety.

TECHNICAL FIELD

This disclosure generally relates to metal forming equipment and processes, and deals more particularly with a method and apparatus for incremental forging.

BACKGROUND

Unitary metallic parts may be fabricated by forging and/or machining a solid block of material. The practice of machining blocks, plates or other forms of blanks may be both time consuming and expensive because a relatively large percentage of the blank may become waste material in the form of machining chips. Fabricating unitary metallic parts using die forging techniques may also be expensive and involve long lead times because of the need to fabricate unique dies for each part. These existing processes may have other issues, including failure to achieve maximum material properties from precipitation hardened aluminum alloys, high residual stresses in precipitation hardened aluminum alloys and/or a requirement for larger than desired quantities of relatively high cost aluminum alloys.

Accordingly, there is a need for a method and apparatus of forging parts that may reduce material usage, and provide improved mechanical properties with lower cost, including reduced tooling costs.

SUMMARY

In accordance with a number of the disclosed embodiments, a part may be fabricated by incrementally forging features in a workpiece using a common toolset. The toolset is used to back extrude any of various features such as flanges, stiffeners and lugs from a workpiece such as flat stock or a forged product. The toolset is used to heat and plasticize successive portions of the workpiece and then extrude the plasticized material into local cavities formed by the tools which act as dams to contain and shape the extruded material. By translating the toolset and the cavity, the feature can be made in any space in an x-y direction. Subsequent passes with the toolset can make the feature thinner and/or taller until the entire part is defined. In one embodiment, the method may also be employed to impart a relatively light temper strain into the workpiece in order to reduce or eliminate residual stresses resulting from quenching, or to prevent the formation of Luders lines in the workpiece. The disclosed embodiments provide a method and apparatus for incremental forging of features without part specific tools or dies. The embodiments may used to wrought net or near net shaped parts without part specific tools or dies.

According to one disclosed embodiment, a method is provided of forging a feature in a workpiece. The method includes bringing a toolset into proximity with a surface of the workpiece and using at least a first tool in the toolset to form a generally enclosed cavity adjacent the workpiece surface. A second tool in the toolset is used to plasticize and extrude a portion of the workpiece into the cavity. The method includes incrementally moving the toolset to different locations on the workpiece, and repeating the steps of forming a cavity, and plasticizing and extruding a portion of the workpiece into the cavity until the entire feature is formed.

According to another embodiment, a method is provided of forging any of various features of a part using a common set of forging tools. The method includes bringing the toolset into proximity with a surface of the workpiece to be forged and forming a cavity adjacent the workpiece surface using certain of the tools. At least one of the tools in the set is used to plasticize a portion of the workpiece, and a part of the feature is formed by using at least one of the tools in the set to extrude the plasticized portion of the workpiece into the cavity. Additional parts of the feature are forged by incrementally moving the set of tools over the workpiece surface and repeating the steps of forming the cavity, plasticizing the workpiece and extruding the plasticized portion into the cavity. Forming the cavity may include using certain of the tools as dams to surround a portion of the workpiece surface and contain the extruded portion of the workpiece. The tool used to plasticize a portion of the workpiece may be used to heat the workpiece through frictional engagement which may be achieved by rotating, reciprocating or oscillating the tool as the tool engages the workpiece.

According to further embodiments, apparatus is provided for forging a feature in a workpiece. The apparatus includes a toolset and means for moving the toolset to each of a plurality of locations on the surface of the workpiece where successive portions of the workpiece may be forged by the toolset. The toolset may include at least a first tool for plasticizing and extruding a portion of the workpiece, and at least a second tool for shaping the extruded portion of the workpiece. The apparatus may further comprise means for displacing the first tool in a direction causing the first tool to frictionally engage the workpiece and in a second direction causing the first tool to plunge into the workpiece. The means for moving the tool set may include a machine tool head having the toolset mounted thereon, a machine tool for displacing the head to each of the plurality of locations on the workpiece, and a programmed controller for controlling the operation of the machine tool and each of the tools in the toolset. The first tool may include an elongated pin rotatable about and displaceable along its longitudinal axis. The second tool is disposed adjacent the first tool and forms a dam for containing the extruded portion of the workpiece.

The disclosed embodiments satisfy the need for a method and apparatus of forming any of various features in a workpiece which reduces tooling and material costs while reducing lead times.

BRIEF DESCRIPTION OF THE ILLUSTRATIONS

DETAILED DESCRIPTION

Figure 1:
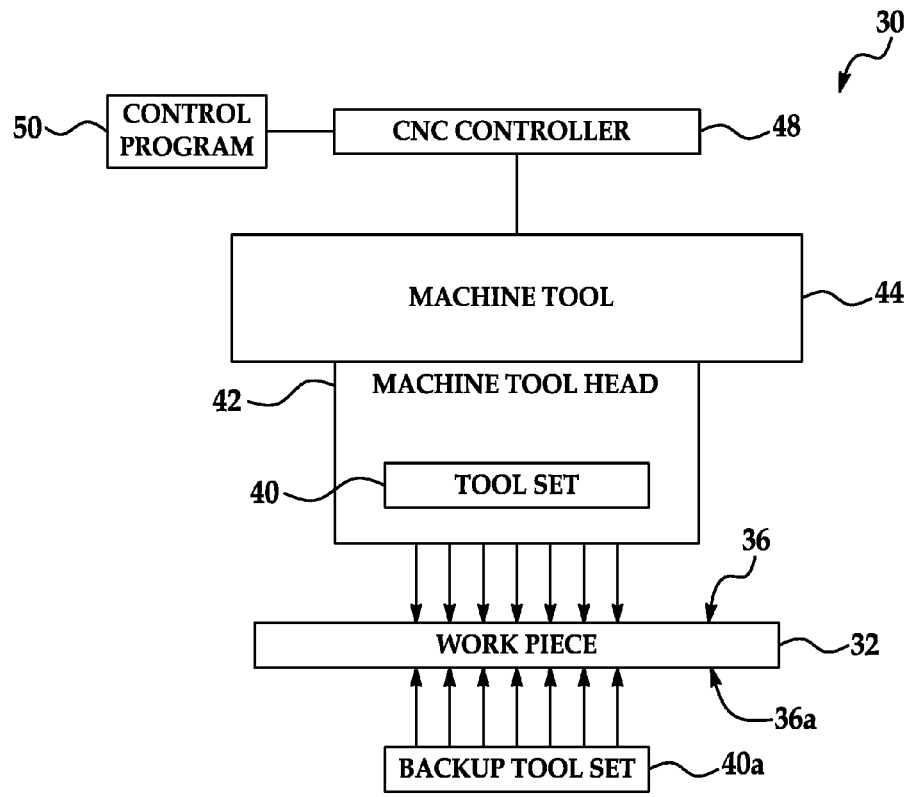
FIG. 1 is an illustration of a block diagram showing components of apparatus for incremental forging.
Figure 2:
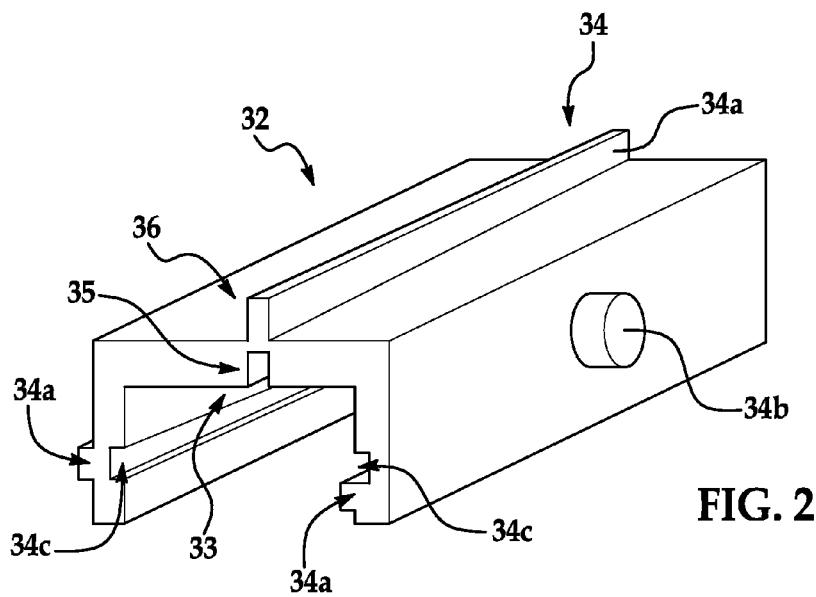
FIG. 2 is an illustration of a perspective view of a part fabricated by an incremental forging technique.

Referring first to FIGS. 1 and 2, the disclosed embodiments broadly relate to apparatus 30 for forging any of various features 34 in a workpiece 32 also sometimes referred to herein as a part. The workpiece 32 may be, without limitation, a blank, a forging or other type of a part of any shape. The workpiece 32 may comprise a metal or metal alloy, however the disclosed method and apparatus may be useful in forming parts 32 made of other materials such as thermoplastics. As shown in FIG. 1, the apparatus 30 may be employed to form the workpiece 32, or to form or refine only selected features 34 (FIG. 2) of the workpiece 32. In the illustrated example, the apparatus 30 has been used to form a metal block into a generally U-shaped part 32 having forged features that include upstanding fins 34a, a boss 34b and recessed channels 34c, however these features are merely illustrative of a wide range of features and shapes that may be incrementally forged using the apparatus 30.

As shown in FIG. 1, the apparatus 30 broadly includes a toolset 40 mounted on a machine tool head 42. The machine tool head 42 may comprise part of a machine tool 44 capable of moving the machine tool head 42 along multiple axes. For example, the machine tool 44 may comprise a 5-axis machining center capable of moving the head 42 along three, orthogonal x, y, z axes (not shown) and rotating the head 42 around two of these axes. In other embodiments, the machine tool 44 may move the workpiece 32 while the machine tool head 42 remains stationary. The operation of the machine tool 44, including movement of the head 42 and control of the toolset 40, may be controlled by a CNC (computer numerically controlled) controller 48 following a control program 50. As will be discussed later in more detail, the toolset 40 comprises a common set of forging tools that are used to incrementally forge portions of one of more features 34 as the head 42 moves the toolset 40 in increments to successive positions along a preprogrammed path (not shown) over a surface 36 of the workpiece 32. "Common set" of forging tools refers to the fact that the tools in the toolset 40 may not be part specific or unique to the type of feature 34 to be formed, but rather may be used to form any of a wide variety of features 34 and parts 32. In some embodiments, an optional backup tool set 40a engaging the opposite surface 36a of the workpiece 32 cooperates with the tool set 40 to aid in the incremental forging process.

Figure 3:
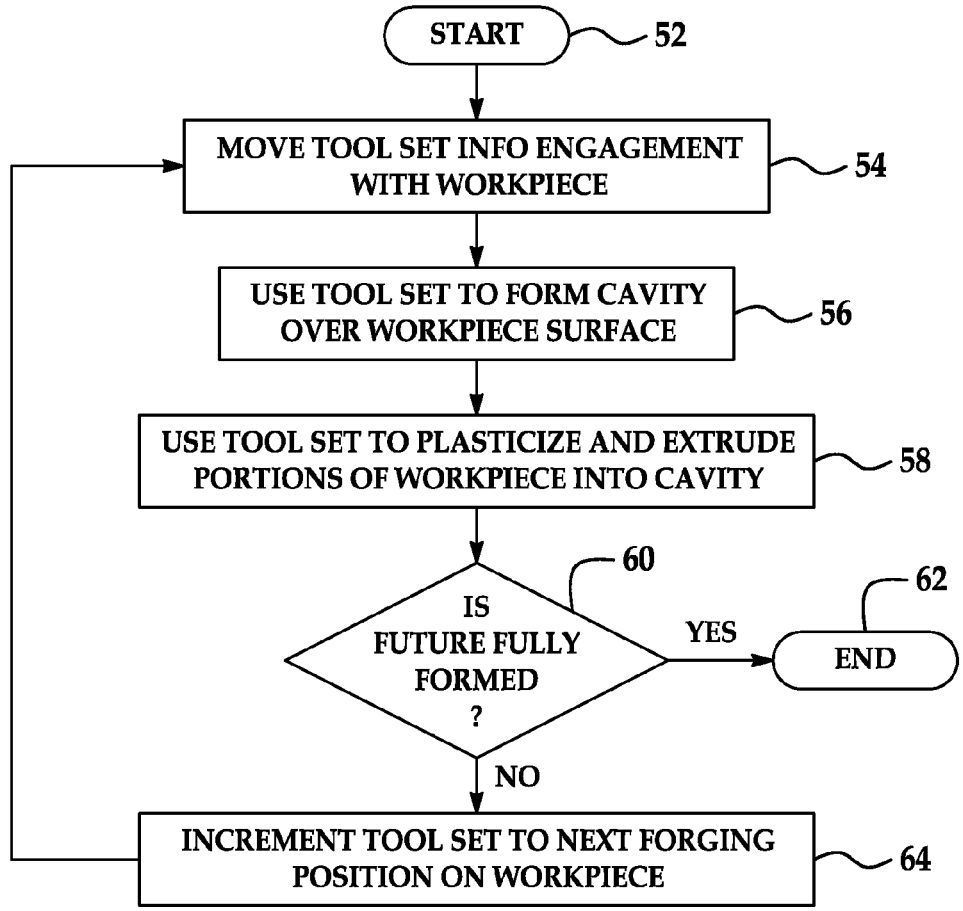
FIG. 3 is an illustration of a flow diagram showing the steps of a method for incremental forging.
Figure 4:
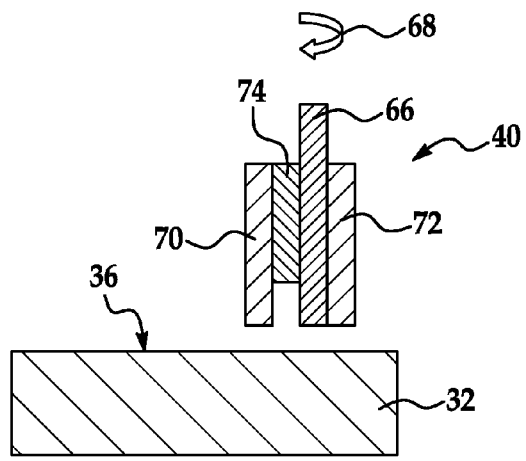
FIG. 4 is an illustration of a front view of a toolset brought into proximity to the surface of the workpiece.

FIG. 3 broadly illustrates the steps of a method for incrementally forging the features 34 in a workpiece 32 using the apparatus 30 shown in FIG. 1. The method starts at step 52 in which a metal blank (not shown) is placed on a machine tool table or bed (not shown) in a known position within the coordinate system of the machine tool 44. At step 54, the toolset 40 is brought into proximity with the workpiece surface 36 at a starting position, and at least certain of the tools in the set 40 are brought into engagement with the workpiece surface 36. At step 56, the toolset 40 is used to form a cavity 76 (see FIG. 5) around or over the workpiece surface 36 into which material may be extruded. At 58, the toolset 40 is used to plasticize and extrude portions of the workpiece 32 into the cavity 76. At 60, if the feature 34 is fully formed, then the process ends at step 62, otherwise, as shown at 64, the toolset 40 is incremented by the machine tool 44 to the next forging position on the workpiece 32 through the programmed movement of the machine tool head 42. Alternatively, as previously noted, the toolset 40 can be incremented to the next forging position by moving the workpiece 32 relative to the toolset 40. In either case, steps 54, 56 and 58 are repeated to form successive portions of the feature 34 until the feature 34 is fully formed.

Figure 2A:
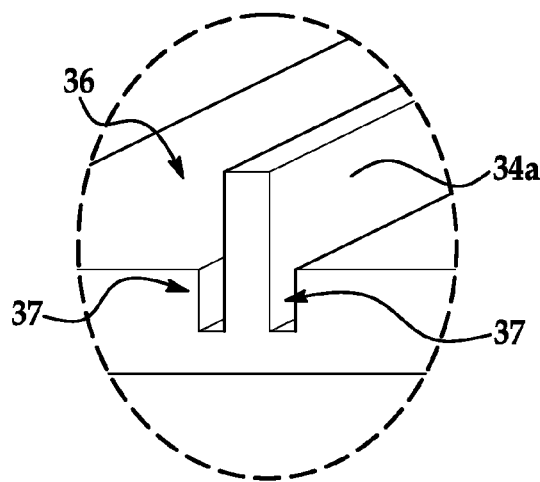
FIG. 2A is an illustration of an enlarged perspective view of a portion of the part shown in FIG. 2, wherein the fin has been forged using an alternate method.

Referring to FIGS. 2 and 2A, the incremental forging performed with the tool set 40 described above may carried out by extruding plasticized material in the workpiece 32 from a location that is either immediately adjacent the feature 34 being formed, or on the side of the workpiece opposite the side on which the feature is formed. For example, in FIG. 1, fin 34a may be formed by extruding material from the bottom side 33 of the workpiece 32, leaving a channel 35 beneath the feature 34a. In contrast, as shown in FIG. 2A, the fin 34a is formed by extruding material from the upper surface 36 of the workpiece 32, on opposite sides of the fin 34a, leaving at least one channel 37 in the surface 36.

Figure 13:
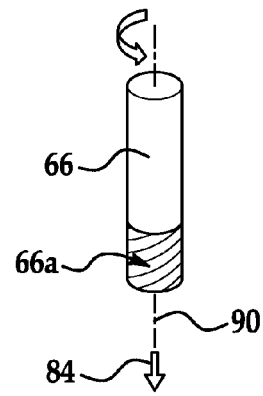
FIG. 13 is an illustration of perspective view of a rotating pin used in the tool sets shown in FIGS. 4-9, 11 and 12 to plasticize and extrude portions of the workpiece.

Attention is now directed to FIGS. 4-7 which illustrate further details of one illustrative embodiment of the toolset 40. In this example, the toolset 40 comprises a cylindrical forging pin 66 which, as shown in FIG. 13, is rotatable about and displaceable along its longitudinal axis 90. The rotating forging pin 66 is surrounded by a series of tools 70, 72, 74, 80a, 80b that act as dams to contain and direct the flow of material extruded from the surface 36 of the workpiece 32. In this embodiment, tools 70, 72, 78, 80a, 80b remain stationary relative to the forging pin 66, while tool 74 is vertically retractable so as to create a cavity 76 over the workpiece surface 36. In this example, an upstanding fin or blade 34a is being formed on the surface 36 of the workpiece 32 by incrementally moving the toolset 40 in the direction shown by the arrow 46 using the machine tool head 42.

Figure 5:
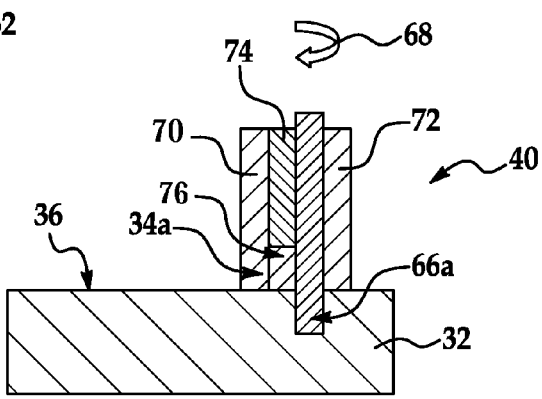
FIG. 5 is an illustration similar to FIG. 4 but showing the toolset having been brought into engagement with the workpiece surface, and one of the tools having extruded a portion of the workpiece material into a cavity.
Figure 6:
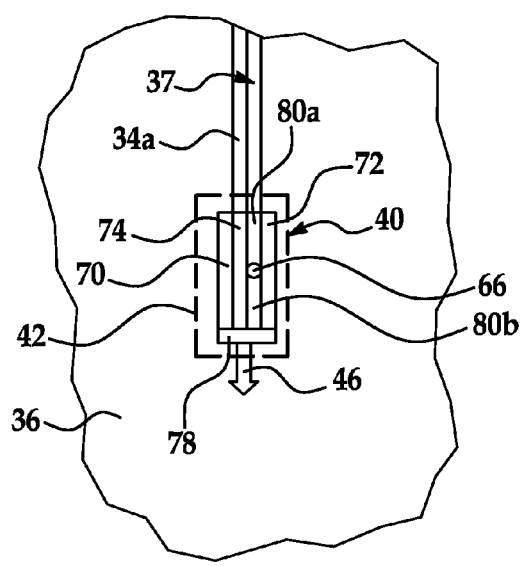
FIG. 6 is an illustration of a top view of the toolset shown in FIGS. 4 and 5, wherein a section of a feature has been incrementally forged by the toolset.
Figure 7:
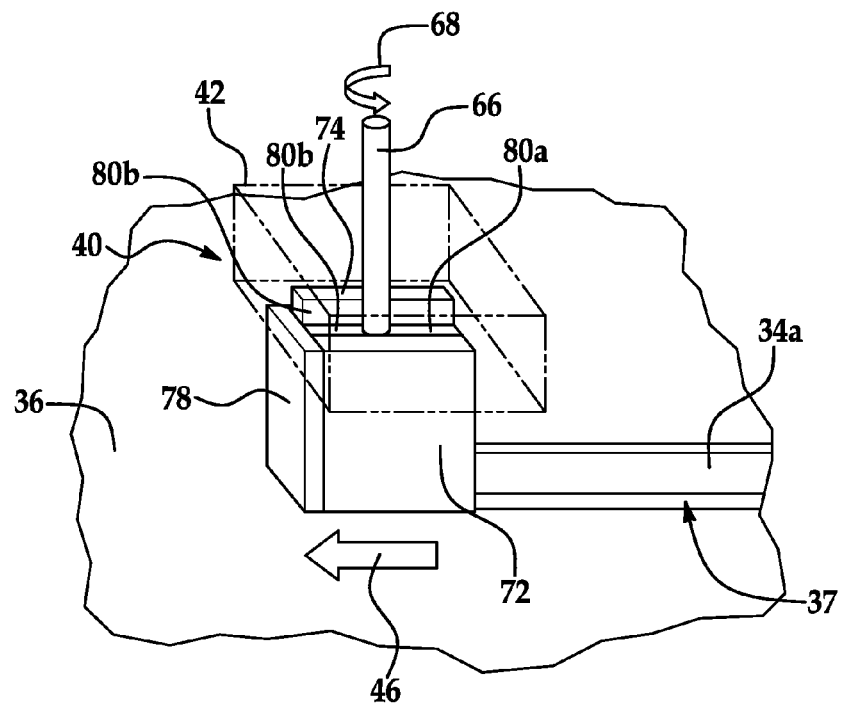
FIG. 7 is an illustration of a perspective view of the toolset shown in FIG. 6.

Referring to FIG. 5, with the toolset 40 positioned at a pre-programmed location on the surface 36 of the workpiece 32, the toolset 40 is brought into engagement with the workpiece surface 36 and tool 74 is retracted upwardly so as to form a cavity 76 of a desired, preprogrammed height. The forging pin 66 is then rotated by the machine tool head 42 as the pin 66 is forced downwardly into frictional engagement with the workpiece surface 36. The frictional engagement between the bottom end 66a of the rotating pin 66 and the workpiece surface 36 results in local heating of the workpiece 32 until the material surrounding the bottom 66a of the pin 66 becomes plasticized and thus becomes flowable and subject to extrusion. As the material becomes plasticized and flowable, the forging pin 66 is plunged further downward, displacing and extruding material in the workpiece 32 into the cavity 76, thereby forming a portion of the desired feature 34 and leaving a channel 37 from which the material has been displaced.

Figure 8:
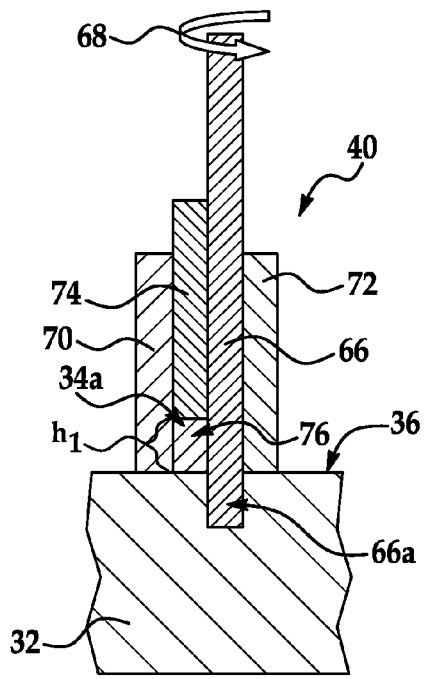
FIG. 8 is an illustration similar to FIG. 5 showing a feature that has been partially formed to a first height using a retractable dam during a first pass of the toolset over the workpiece.
Figure 9:
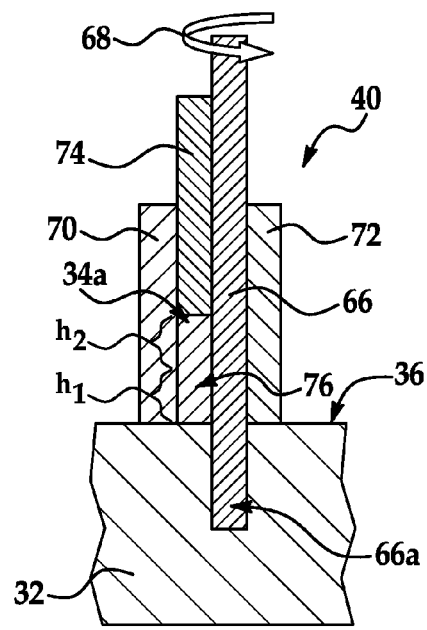
FIG. 9 is an illustration similar to FIG. 8 but showing the feature formed to a second, greater height during a subsequent pass of the toolset.
Figure 10:
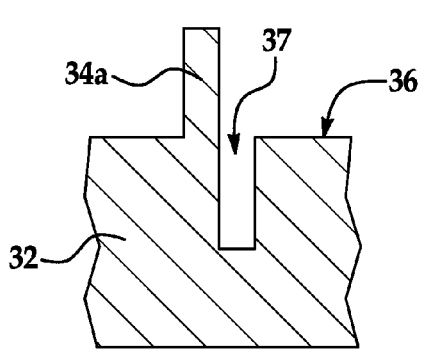
FIG. 10 is an illustration of a sectional view of the fully formed feature forged by the tool set shown in FIGS. 8 and 9.

In some cases, it may be necessary to make multiple passes in order to form the feature 34 to the desired dimensions. For example, as shown in FIG. 8, during a first pass of the tool set, the feature 34 is formed to a height $h_1$, determined by the retracted position of the tool 74. Referring to FIG. 9, during a second pass of the tool set 40 over the workpiece surface 36, tool 74 is retracted upwardly beyond the height $h_1$ by an amount $h_2$. During this second pass, the lower end 66a of the forging pin 66 is plunged deeper into the workpiece 32 in order to extrude an additional amount of material into the cavity 76 which increases in height due to the additional retraction of the tool 74. FIG. 10 illustrates the final feature 34a forged on the surface workpiece 32, along with a channel 37 from which the material has been extruded to form the feature 34a.

Figure 11:
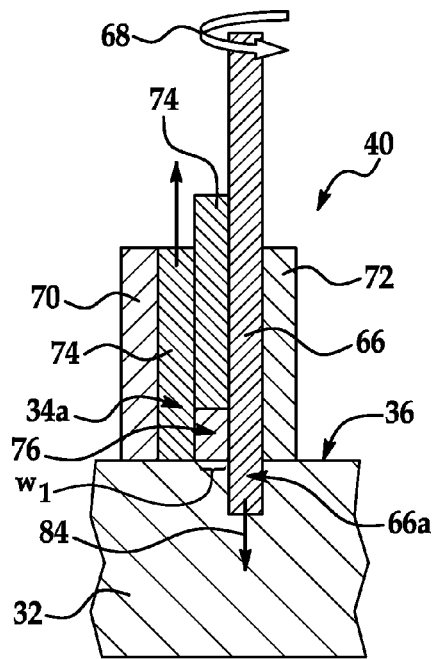
FIG. 11 is an illustration similar to FIG. 8 but showing a laterally displaceable tools used to increase the width of an extruded feature.
Figure 12:
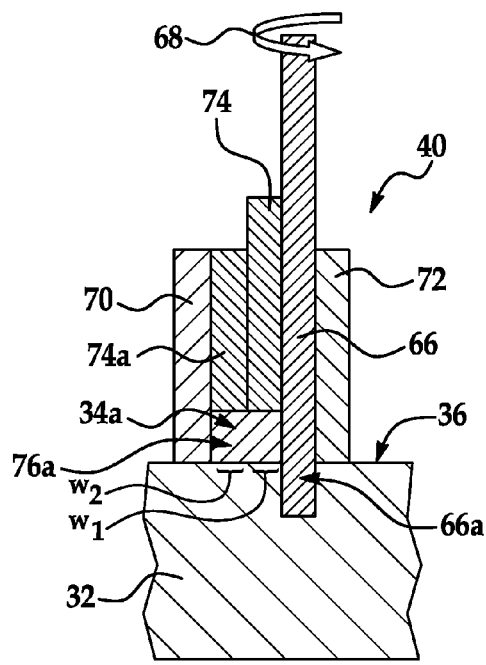
FIG. 12 is an illustration similar to FIG. 10 but showing one of the tools having been laterally displaced and the extruded feature increased in width during a second incremental forging step.

FIGS. 11 and 12 illustrate a toolset 40 generally similar to those previously described, but wherein tool 70 and two tools 74 are laterally displaceable. For example, as shown in FIG. 11, tools 74 function as dams that form, along with rotating pin 66, a cavity 76 having an initial width $w_1$. Thus, during a first pass with the tool set 40, a feature is partially formed to a first width $w_1$. Then, as shown in FIG. 12, tool 70 is laterally displaced and one of the tools 74 moves upwardly, causing the cavity 76 to increase in width to $w_1+w_2$. During a second pass of the tool set 40 containing the wider cavity 76a, the remaining portion of the feature is formed which has a final width substantially equal to that of the wider cavity 76a, i.e. $w_1+w_2$.

Figure 14:
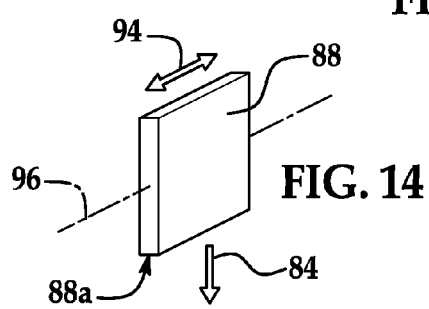
FIG. 14 is an illustration of perspective view of an alternate form of a tool using a linear motion to plasticize and extrude portions of the workpiece.

FIG. 13 shows the rotating forging pin 66 previously described, and is illustrative of one type of motion that may be used to generate the friction required to plasticize the workpiece material. The cylindrical pin 66, which may or may not have threads on its lower end 66a to increase the friction with the workpiece 32, is rotatable about its longitudinal axis 90. Other forms and shapes of forging tools are possible that may use other types of motion to produce the necessary friction with the workpiece 32. For example, FIG. 14 illustrates the use of a generally square or rectangular forging tool 88 which has a reciprocating motion as shown by the arrow 94, so that the bottom surface 80a frictionally engages the workpiece surface 36 with a back-and-forth or reciprocating motion generally along an axis 96. The forging tool 88 is vertically displaceable as shown by the arrow 84 in order to extrude material into an adjacent cavity 76. The materials, surface textures and reciprocation speeds should be chosen such that the heat generated by the friction is sufficient to plasticize the workpiece material to allow extrusion, but is not so high as to resulting in welding of the material.

Figure 15:
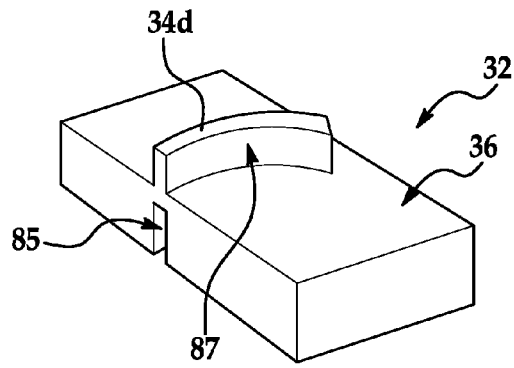
FIG. 15 is an illustration of perspective view of a workpiece having a curved feature formed by incremental forging.
Figure 16:
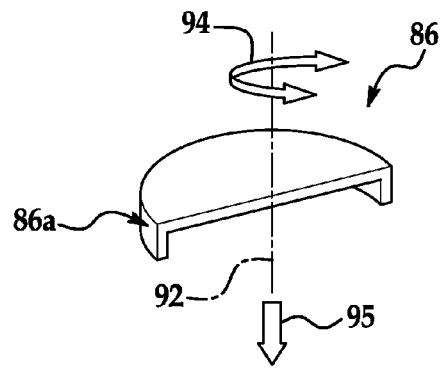
FIG. 16 is an illustration of perspective view of one of the oscillating tools used to incrementally forge the curved feature shown in FIG. 15.

Referring now to FIGS. 15 and 16, a curved feature 34d may be incrementally forged in a workpiece 32 using a toolset (not shown) that includes one or more curved forging tools 86. In the illustrated example, the curved forging tool 86 has a semicircular shape, however other shapes are possible. The tool 86 oscillates back-and-forth about an axis 92 as shown by the arrow 94, and includes a curved outer peripheral surface 86a that is engageable with the workpiece 32 to forge a curved surface 87 on the feature 34d. The tool 86 is displaceable toward and away from the feature 34d, as shown by the arrow 95.

Figure 17:
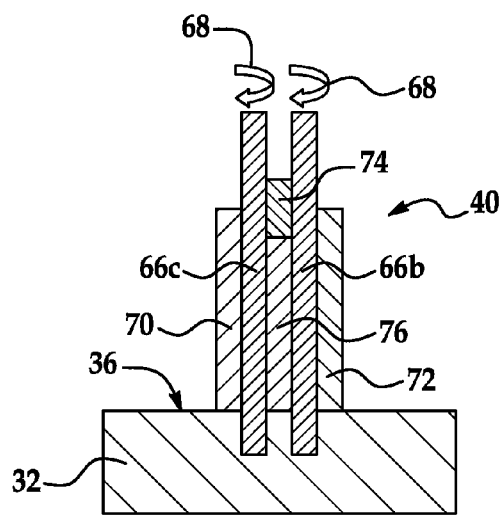
FIG. 17 is an illustration of a front view of a toolset forging a portion of the workpiece wherein a pair of rotating pins cooperate to extrude material into a cavity.

FIG. 17 illustrates another embodiment of a toolset 40 employing a pair of rotating forging pins 66b, 66c which are spaced apart to form a cavity 76 into which plasticized material from the workpiece 32 may be extruded. A retractable tool 74 forming a dam between the pins 66b, 66c control the height of the extruded feature 36. Outer tools 70, 72 act as stationary dams that assist in constraining the flow of plasticized material into the cavity 76.

Figure 18:
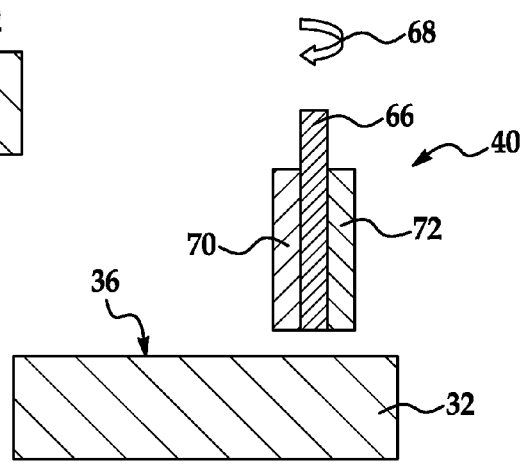
FIG. 18 is an illustration of a front view of an alternate form of the toolset that may be used to temper a workpiece surface.
Figure 19:
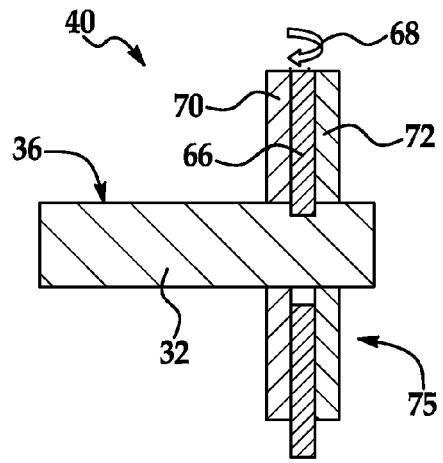
FIG. 19 is an illustration similar to FIG. 18 but showing the toolset and a set of backup tools having been brought into contact with the workpiece surface and a tempering tool having partially penetrated the surface.

Referring to FIGS. 18 and 19, the embodiments may also be employed to apply a light (e.g. approximately 1% to 5%) temper strain into the workpiece 32 in order to eliminate residual stresses from quenching, or to prevent the formation of Luders lines on the material. Substantially uniform compression stress relief may be achieved normal to the surface 36 of a part. The toolset 40 may be used to perform uniform, overall stress relief of an entire area of a workpiece or to carry out a localized compression stress relief treatment. In some applications, the toolset 40 may be employed to vary the amount of compression stress relief as a function of the location on the surface of the part. FIG. 18 illustrates a simplified toolset 40 used to provide compression stress relief. The toolset 40 includes a rotatable forging pin 66 sandwiched between a pair of constraining tools 70, 72. In FIG. 19, the toolset 40 has been brought into engagement with a workpiece surface 36 in order to carry out compression stress relief. A backup toolset 75 may be used to aid in the process. The rotating forging pin 66 is plunged slightly into the surface 36 while the constraining tools 70, 72 act to constrain the movement of material that is displaced by the rotating forging pin 66. The toolset 40 is moved over the surface 36 in order to perform the desired compression stress relief. The tool set 40 shown in FIG. 17 employing dual forging pins 66b, 66c may also be used to carry out compression stress relief.

Figure 20:
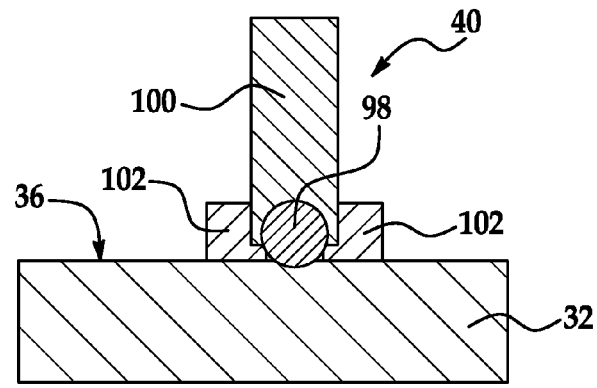
FIG. 20 is an illustration of a front view of another toolset employing a roller ball used to temper a workpiece surface.

Attention is now directed to FIG. 20 which illustrates another form of the toolset 40 that may be used to carry out compression stress relief. In this embodiment, a roller ball 98 is rotatable within a tool 100 that may be used to move the ball 98 across the workpiece surface 36 in order to eliminate shear stresses and place the workpiece surface 36 into substantially pure compression in order to eliminate residual stresses. Side tools 102 function as dams to constrain the movement of material in the workpiece surface 36 displaced by the roller ball 98.

Figure 21:
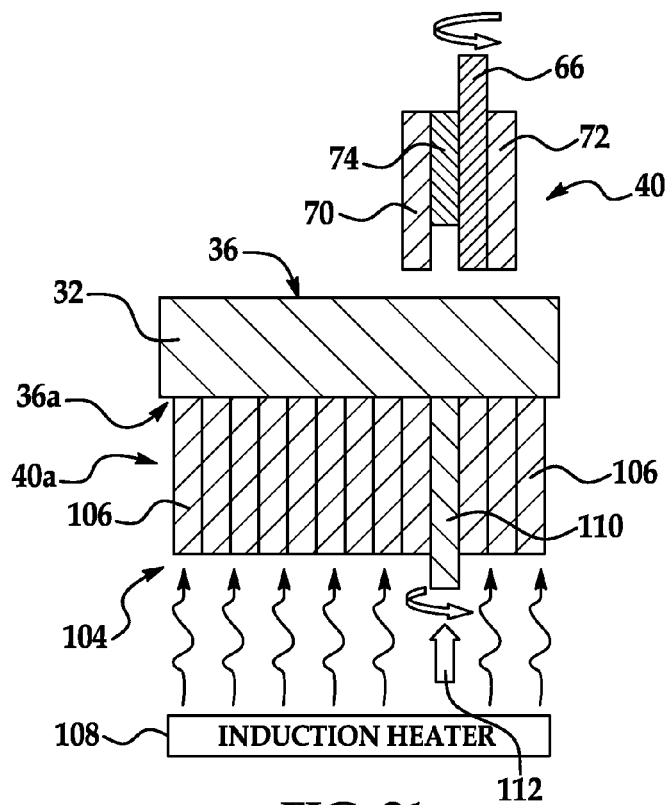
FIG. 21 is an illustration of a front view of another toolset and locally heated backup tools used to assist in the incremental forging process.
Figure 22:
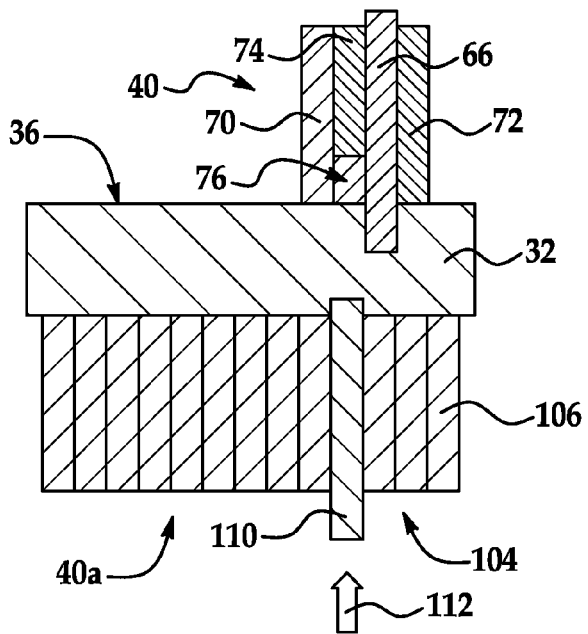
FIG. 22 is an illustration similar to FIG. 21 but showing positions of the tools during extrusion.

Referring now to FIG. 21, in another embodiment, the disclosed toolset 40 may be used in combination with a backup tool set 40a comprising a set 104 of individual backup pins 106 which are positioned to engage the side 36a of the workpiece 32 opposite of the workpiece surface 36. Each of the backup pins 106 may be moved longitudinally toward and away from the workpiece 32 as shown by the arrow 112. The pins 106 may be locally heated using, for example and without limitation, an induction heater 108. Heating of the pins 106 aids in plasticizing the workpiece 32 by raising the temperature of the workpiece material and the area being worked by the toolset 40. As shown in FIG. 22, as the toolset 40 is being brought into engagement with the workpiece surface 36, one of the pins 110 directly opposite of the extrusion cavity 76 may be displaced into the workpiece 32 in order to aid in the forging process, which may be particularly useful when using workpieces 32 having thicker cross sections.

Figure 23:
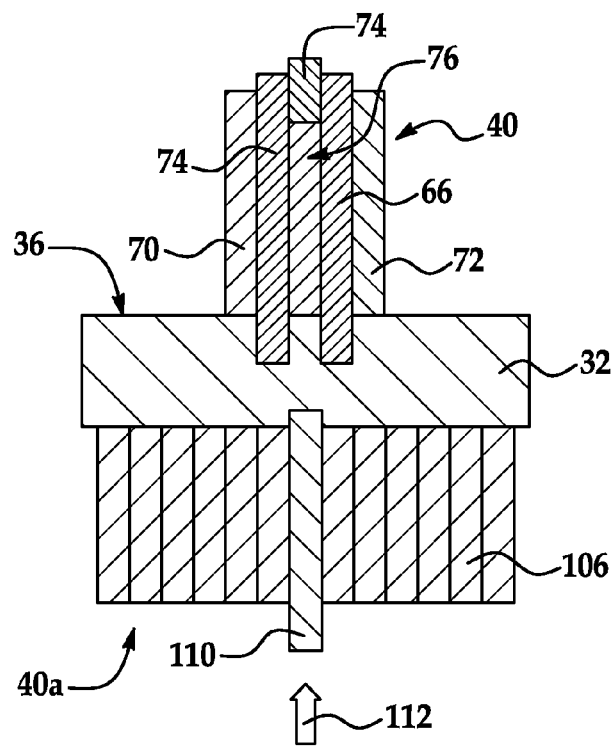
FIG. 23 is an illustration of a front view of another toolset and related backup tooling during extrusion.

The use of heated backup pins 106 may be advantageously employed with any of the toolsets 40 previously described. For example, FIG. 23 illustrates a toolset 40 similar to that previously described in connection with FIG. 17. In this example, one of the backup pins 110 may be displaced as shown by the arrow 112 into the workpiece 32 directly opposite of the extrusion cavity 76. A pair of rotating forging tools 66b, 66c may be used in unison to form features that are taller or thinner, or to locally deform the workpiece 32 in order to eliminate residual stresses or compensate for distortion.

Figure 24:
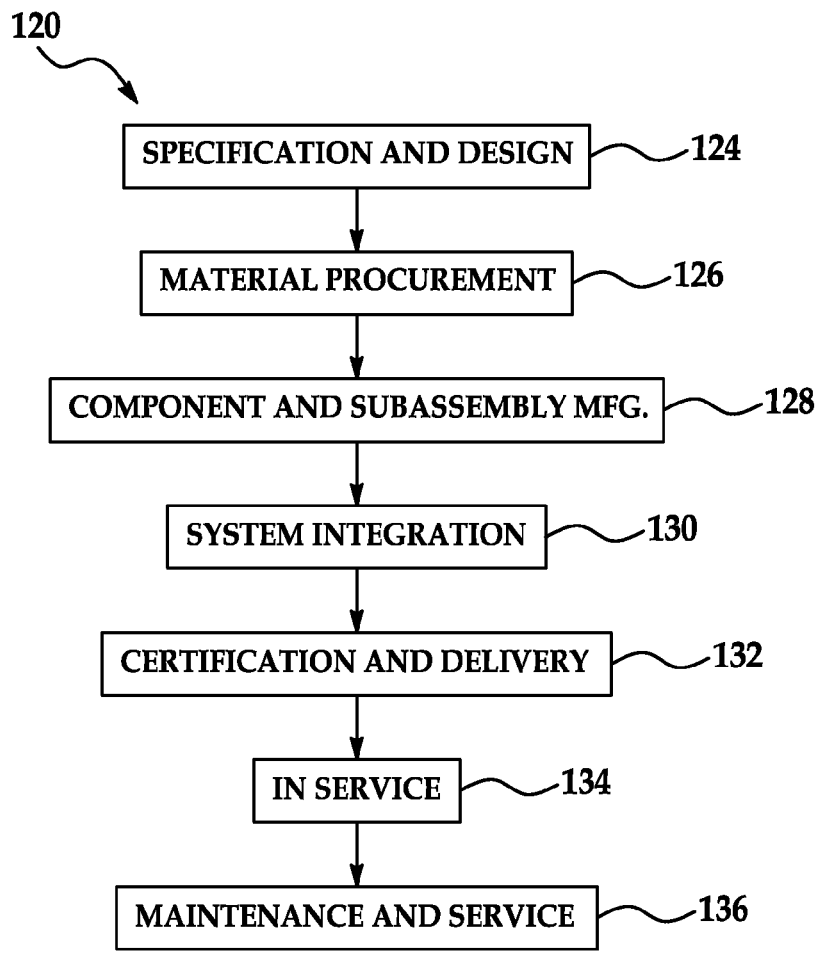
FIG. 24 is an illustration of a flow diagram of aircraft production and service methodology.
Figure 25:
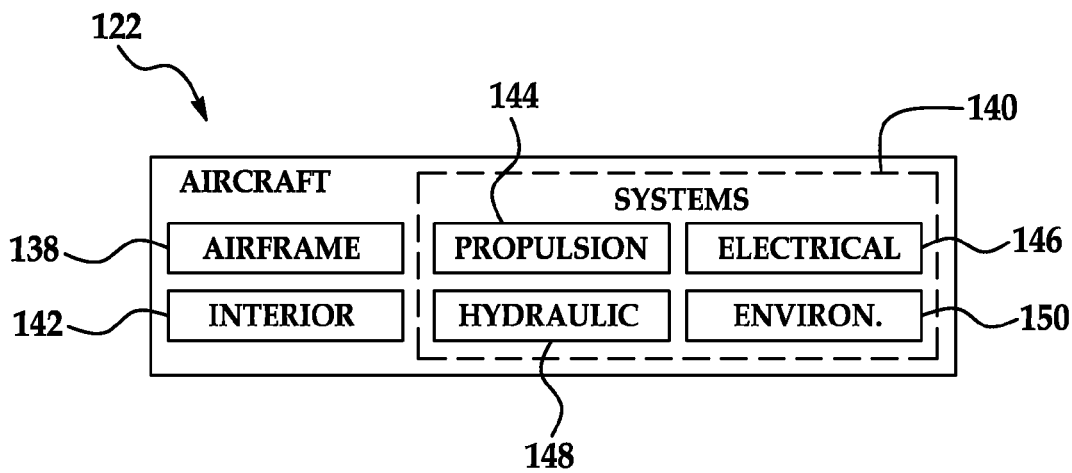
FIG. 25 is an illustration of a block diagram of an aircraft.

Embodiments of the disclosure may find use in a variety of potential applications, particularly in the transportation industry, including for example, aerospace, marine and automotive applications. Thus, referring now to FIGS. 24 and 25, embodiments of the disclosure may be used in the context of an aircraft manufacturing and service method 120 as shown in FIG. 24 and an aircraft 122 as shown in FIG. 25. During pre-production, exemplary method 120 may include specification and design 124 of the aircraft 122 and material procurement 126. The disclosed method may be specified for use in making parts during the specification and design 124 of the aircraft 122. During production, component and subassembly manufacturing 128 and system integration 130 of the aircraft 122 takes place. The disclosed method may be used to manufacture parts during the component and subassembly manufacturing process 128. Thereafter, the aircraft 122 may go through certification and delivery 132 in order to be placed in service 134. While in service by a customer, the aircraft 122 is scheduled for routine maintenance and service 136 (which may also include modification, reconfiguration, refurbishment, and so on). Parts manufactured by the disclosed method and apparatus may be installed on the aircraft 122 during the maintenance and service 136.

Each of the processes of method 140 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 25, the aircraft 122 produced by exemplary method 120 may include an airframe 138 with a plurality of systems 140 and an interior 142. Parts manufactured with the use of the disclosed apparatus may be used in the airframe 138 and within the interior 142. Examples of high-level systems 140 include one or more of a propulsion system 144, an electrical system 146, a hydraulic system 148, and an environmental system 150. Any number of other systems may be included. Although an aerospace example is shown, the principles of the disclosure may be applied to other industries, such as the marine and automotive industries.

Systems and methods embodied herein may be employed during any one or more of the stages of the production and service method 120. For example, components or subassemblies corresponding to production process 128 may be fabricated or manufactured in a manner similar to components or subassemblies produced while the aircraft 122 is in service. Also, one or more of the disclosed method and apparatus embodiments may be utilized during the production stages 128 and 130, for example, by substantially expediting assembly of or reducing the cost of an aircraft 122. Similarly, one or more of the apparatus embodiments, method embodiments, or a combination thereof may be utilized while the aircraft 122 is in service.

Although the embodiments of this disclosure have been described with respect to certain exemplary embodiments, it is to be understood that the specific embodiments are for purposes of illustration and not limitation, as other variations will occur to those of skill in the art.

What is claimed:

1. An apparatus, comprising:
   first and second forging elements to frictionally engage a workpiece such that a material of the workpiece becomes flowable, wherein the first and second forging elements are to frictionally engage the workpiece by oscillating a semicircular feature of at least one of the first and second forging elements; and
   a tool positioned between the first and second forging elements and movable relative to the first and second forging elements along an axis, wherein movement of the first tool relative to the first and second forging elements along the axis forms a cavity to receive the flowable material of the workpiece.

2. The apparatus of claim 1, wherein the first forging element is parallel to the second forging element.

3. The apparatus of claim 1, wherein the cavity is defined by a surface of the workpiece, the first and second forging elements, and the tool.

4. The apparatus of claim 1, wherein the first and second forging elements are to frictionally engage the workpiece by plunging the first and second forging elements into the workpiece.

5. The apparatus of claim 4, wherein plunging the first and second forging elements into the workpiece such that the material becomes flowable comprises plasticizing the material.

6. The apparatus of claim 1, wherein the tool is movable relative to the first and second forging elements along the axis to a plurality of positions to define a shape of a feature to be formed on the workpiece.

7. A method, comprising:
   bringing a set of tools into proximity with a surface of a workpiece to be forged, the set of tools including first and second forging elements;
   retracting a movable tool disposed between the first and second forging elements to a first position to form a cavity defined by the surface of the workpiece, the first and second forging elements, and the movable tool; and
   frictionally engaging the workpiece with at least one of the first and second forging elements to plasticize a first portion of the workpiece and to cause the plasticized first portion to flow into the cavity.

8. The method of claim 7, wherein frictionally engaging the workpiece comprises making a first pass over the workpiece while plasticizing the first portion of the workpiece.

9. The method of claim 8, further comprising:
   after making the first pass over the workpiece, retracting the movable tool to a second position different from the first position; and
   frictionally engaging the workpiece while making a second pass to plasticize a second portion of the workpiece.

10. The method of claim 9, wherein the second position is a greater distance away from the surface of the workpiece than the first position.

11. The method of claim 7, wherein the first forging element is parallel to the second forging element.

12. The method of claim 7, further comprising simultaneously plunging the first and second forging elements into the workpiece to plasticize the first portion of the workpiece.

13. The method of claim 7, wherein frictionally engaging the workpiece comprises rotating at least one of the first and second forging elements to heat the workpiece.

* * * * *